US007226075B2

(12) United States Patent
Nagata et al.

(10) Patent No.: US 7,226,075 B2
(45) Date of Patent: Jun. 5, 2007

(54) KNEE-PROTECTING AIRBAG DEVICE

(75) Inventors: Atsushi Nagata, Aichi-ken (JP);
Kazuhiro Nakayama, Aichi-ken (JP);
Tatsuya Hayakawa, Toyota (JP); Eiichi Yamada, Nissin (JP); Hitoshi Kondo, Kariya (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 483 days.

(21) Appl. No.: 10/801,074

(22) Filed: Mar. 16, 2004

(65) Prior Publication Data
US 2004/0207183 A1 Oct. 21, 2004

(30) Foreign Application Priority Data
Mar. 19, 2003 (JP) ............................. 2003-076359

(51) Int. Cl.
*B60R 21/22* (2006.01)
(52) U.S. Cl. ........................ 280/731; 280/731; 280/752
(58) Field of Classification Search ............. 280/730.1, 280/730.2, 731, 732, 752
See application file for complete search history.

(56) References Cited
U.S. PATENT DOCUMENTS
2,834,606 A * 5/1958 Bertrand .................. 280/730.1
3,784,223 A * 1/1974 Hass et al. ................ 280/730.1
6,942,245 B2 * 9/2005 Takimoto et al. ......... 280/730.1
2002/0171230 A1 * 11/2002 Takimoto et al. ........ 280/730.1
2004/0164527 A1 * 8/2004 Nagata et al. ........... 280/730.1

FOREIGN PATENT DOCUMENTS
EP WO 02/04261 A1 1/2002

* cited by examiner

*Primary Examiner*—Lesley D. Morris
*Assistant Examiner*—Joseph Rocca
(74) *Attorney, Agent, or Firm*—Posz Law Group, PLC

(57) ABSTRACT

A knee-protecting airbag device is located below a steering column in front of a driver and, at a lower side of a key cylinder into which an ignition key with accessories is inserted. The airbag device includes a housing located below the steering column for housing an airbag and an airbag. The airbag is folded and housed in the housing in undeployed condition, and upon inflow of inflation gas, protrudes rearward from the housing to deploy upward to protect knees of the driver. The airbag is provided in its upper edge in completely deployed condition with a cover portion for covering vehicle's rearward of an area proximate to the key cylinder. The airbag is further provided with a flexible reinforcing cloth to be located in a part of the cover portion to contact the key accessories as the key is inserted into the key cylinder. The airbag is protected by the reinforcing cloth even if it contacts with the key accessories upon deployment.

6 Claims, 17 Drawing Sheets

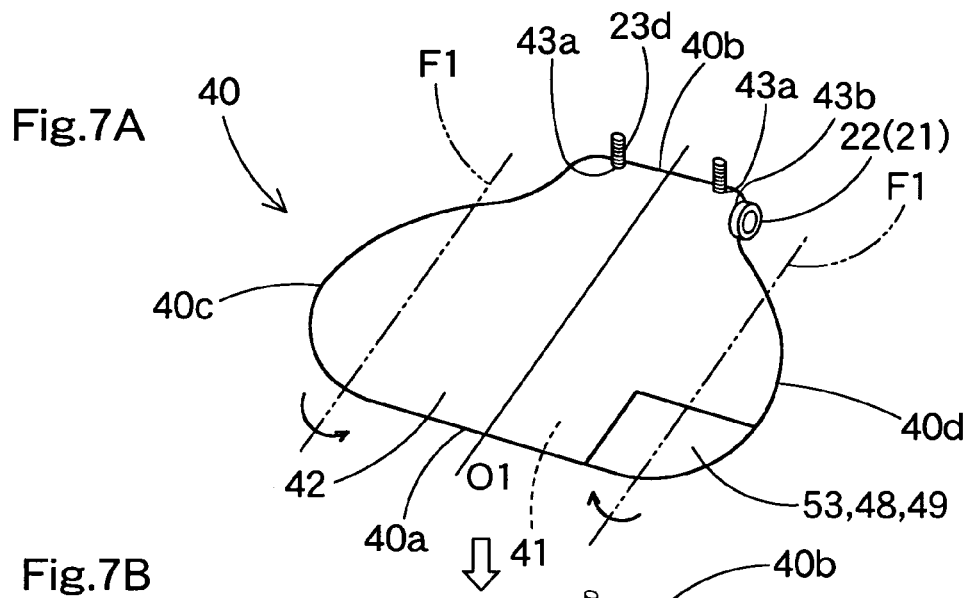
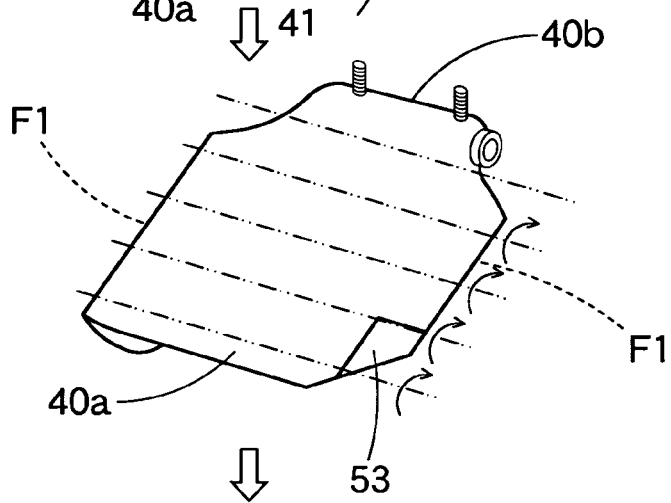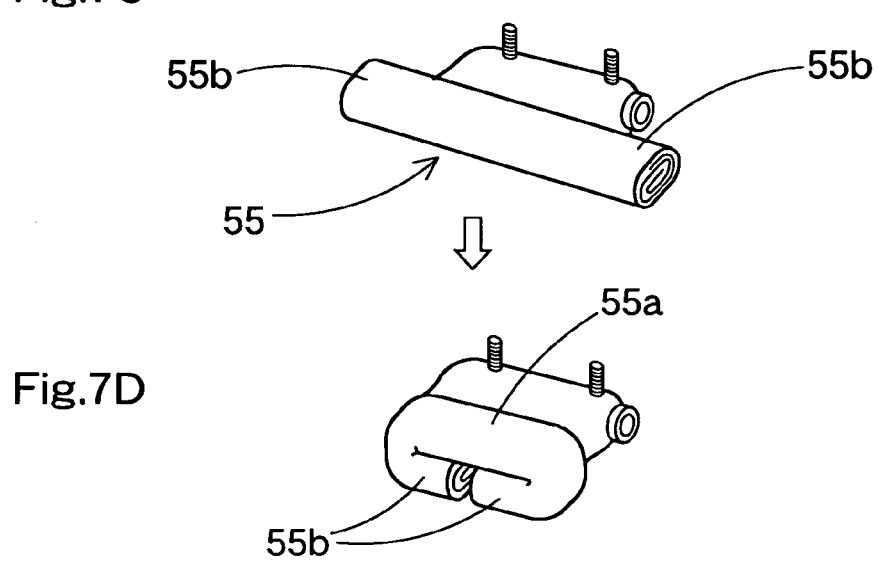

KNEE-PROTECTING AIRBAG DEVICE

The present application claims priority from Japanese Patent Application No. 2003-076359 of Nagata et al., filed on Mar. 19, 2003, the entirety of which is hereby incorporated into the present application by reference.

BACKGROUND OF THE INVENTION

1. Field of the Invention

The present invention relates to a knee-protecting airbag device which protects knees of a driver by an airbag expanding and inflating with inflation gas.

2. Description of the Related Art

In a conventional knee-protecting airbag device for protecting knees of a driver, a folded airbag is housed in and held by a housing located in front of the driver. Upon inflow of inflation gas, the airbag rises along the lower surface of a steering column, and deploys for protecting the driver's knees. The airbag as completely deployed is provided, in the vicinity of left or right corner in its upper edge, with a cover portion for covering vehicle's rearward of an area proximate to the key cylinder, as disclosed in WO 02/04261 A1.

However, there are some cases in which accessories such as a spare key are hung down from a car key inserted into the key cylinder. If the airbag in this case deploys, lower ends of the accessories may contact an inflated part of the airbag, and damage the airbag.

SUMMARY OF THE INVENTION

The present invention contemplates to solve the above mentioned problem, and therefore, has an object to provide a knee-protecting airbag device capable of protecting the airbag in the event that an inflating airbag contacts with accessories connected with a car key.

The knee-protecting airbag device according to the present invention is located below a steering column in front of a driver and, at a lower side of a key cylinder into which an ignition key with accessories is inserted. The airbag device includes an airbag and a housing located below the steering column for housing the airbag. The airbag is folded and housed in the housing in undeployed condition, and upon inflow of inflation gas, protrudes rearward from the housing to deploy upward to protect knees of the driver. The airbag is provided in its upper edge in completely deployed condition with a cover portion for covering vehicle's rearward of an area proximate to the key cylinder. The airbag is further provided with a flexible reinforcing cloth located in a part of the cover portion to contact the key accessories as the key is inserted into the key cylinder.

The knee-protecting airbag device of the present invention protrudes rearward from the housing and rises while expanding when fed with inflation gas. At this time, even if the airbag contacts the key accessories hung down from the key inserted into the key cylinder, the airbag is able to complete deployment smoothly since the airbag is provided in a portion to contact the accessories with the reinforcing cloth, and the reinforcing cloth protects the airbag upon contacting the accessories. In addition, the airbag is folded easily, since the reinforcing cloth is flexible.

In the knee-protecting airbag device of the present invention, therefore, the airbag is able to protect the knees of driver securely since the airbag is protected by the reinforcing cloth, even if the deploying airbag contacts the accessories connected to the key.

If the airbag completely deployed forms a substantially plate shape including a column side wall located toward the steering column and a driver's side wall located toward the driver, it is desired that the reinforcing cloth is applied to an airbag part to contact the key accessories, both in the column side wall and the driver's side wall.

With this arrangement, the airbag is protected whichever of the column side wall and the driver's side wall contacts the key accessories in airbag deployment. Therefore, the air bag is protected and thus is able to deploy stably even when, for example, a change of the folding method of the airbag or a change in behavior of the airbag cause a reversal of the part to contact the key accessories in the column side wall and the driver's side wall.

In this case, the reinforcing cloth may be made of a single sheet member such that the cloth is located in the column side wall and the driver's side continuously. Alternatively, the cloth may be made of two sheet members.

If the airbag completely deployed forms a substantially plate shape including a column side wall located toward the steering column and a driver's side wall located toward the driver, and the airbag is manufactured by being stitched up at outer edges of the column side wall and the driver's side wall, it is desired that the reinforcing cloth is stitched up together when the outer edges of the column side wall and the driver's side wall are stitched up, and that the reinforcing cloth is applied to the airbag only by the stitching to the outer edges of the column side wall and the driver's side wall.

This arrangement is able to omit a separate stitching work of the reinforcing cloth to the column side wall and the driver's side wall. Therefore, the airbag having the reinforcing cloth is easily manufactured.

In this case, too, the reinforcing cloth is desirably applied both to the column side wall and the driver's side wall. Moreover, in this case, too, the reinforcing cloth may be made of a single sheet member such that the cloth is located in the column side wall and the driver's side continuously. Alternatively, the cloth may be made of two sheet members.

Furthermore, the reinforcing cloth may be located on whichever of the outer surface or inner surface of the airbag body.

BRIEF DESCRIPTION OF DRAWINGS

FIGS. 7A to 7D illustrate folding processes of the airbag of FIG. 4;

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
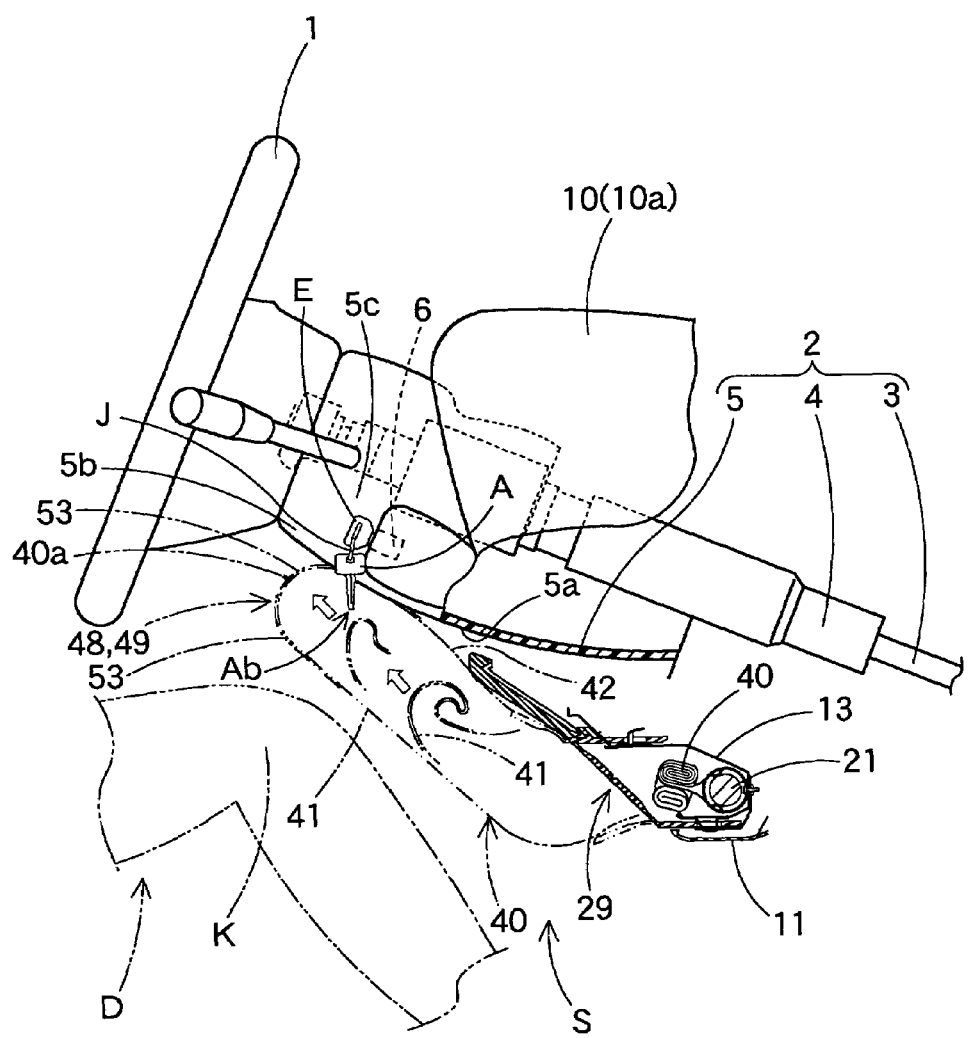
FIG. 1 is a schematic vertical section of an embodiment of the knee-protecting airbag device according to the present invention in deployment, taken along the front-rear direction of the vehicle.
Figure 8A:
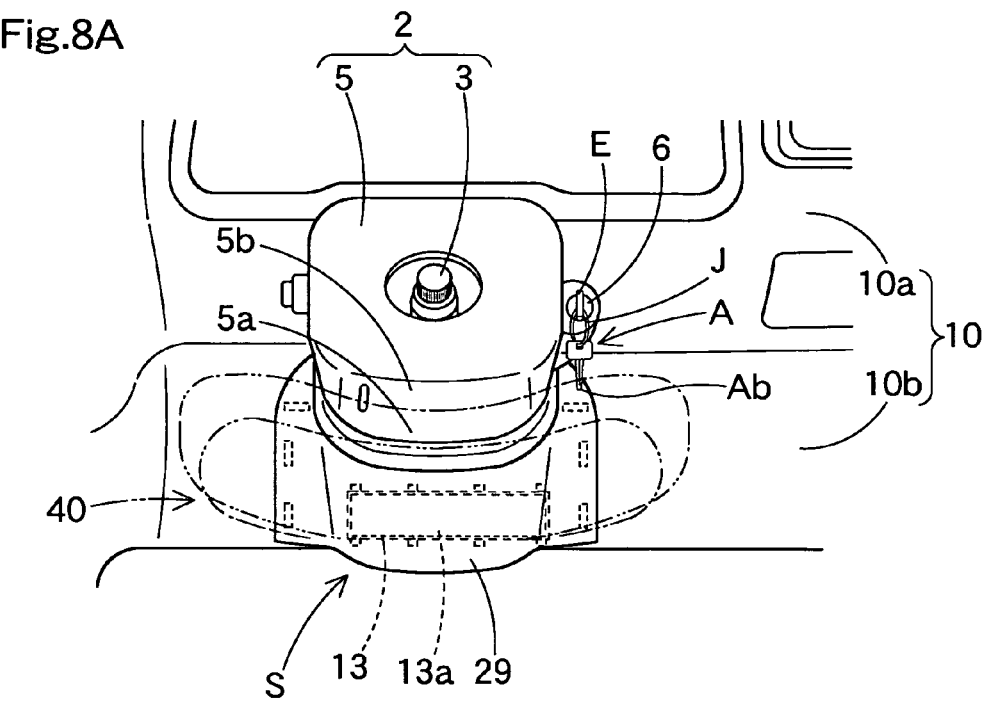
FIGS. 8A and 8B are front views illustrating the deployment processes of the knee-protecting airbag device of FIG. 1.

It is shown in FIGS. 1 and 8A that a knee-protecting airbag device S is located below the steering column 2 and in front of a driver D for protecting knees K of the driver D.

Up-down, front-rear, and left-right in this specification are based on a state in which the airbag device S is mounted on the vehicle, and therefore, correspond to up-down, front-rear, and left-right of the vehicle with the airbag device mounted thereon.

Referring to FIG. 1, the steering column 2 includes a main shaft 3 connected to a steering wheel 1, a column tube 4 for covering the main shaft 3, and a column cover 5 for covering those members.

The column cover 5 is made of synthetic resin into a substantially square cylindrical shape, and is so located along the axial direction of the main shaft 3 as to cover the main shaft 3 and the column tube 4 located below the steering wheel 1. The column cover 5 is located to ascend obliquely backward from an instrument panel (as will be called "dashboard" herein below) 10. In a right side 5c of the column cover 5 is located a key cylinder 6 to insert an ignition key E for starting engine thereinto. In the illustrated embodiment, accessories A such as a spare key (as will be called "key accessories") are hung down from the ignition key E inserted in the key cylinder 6 by a connecting means J such as a connecting ring.

The knee-protecting airbag device S includes a folded airbag 40, an inflator 21 for supplying the airbag 40 with inflation gas, a housing 13 opened rearward for housing the folded airbag 40 and the inflator 21, and an airbag cover 29 for covering vehicle's rearward of the housing 13.

Figure 2:
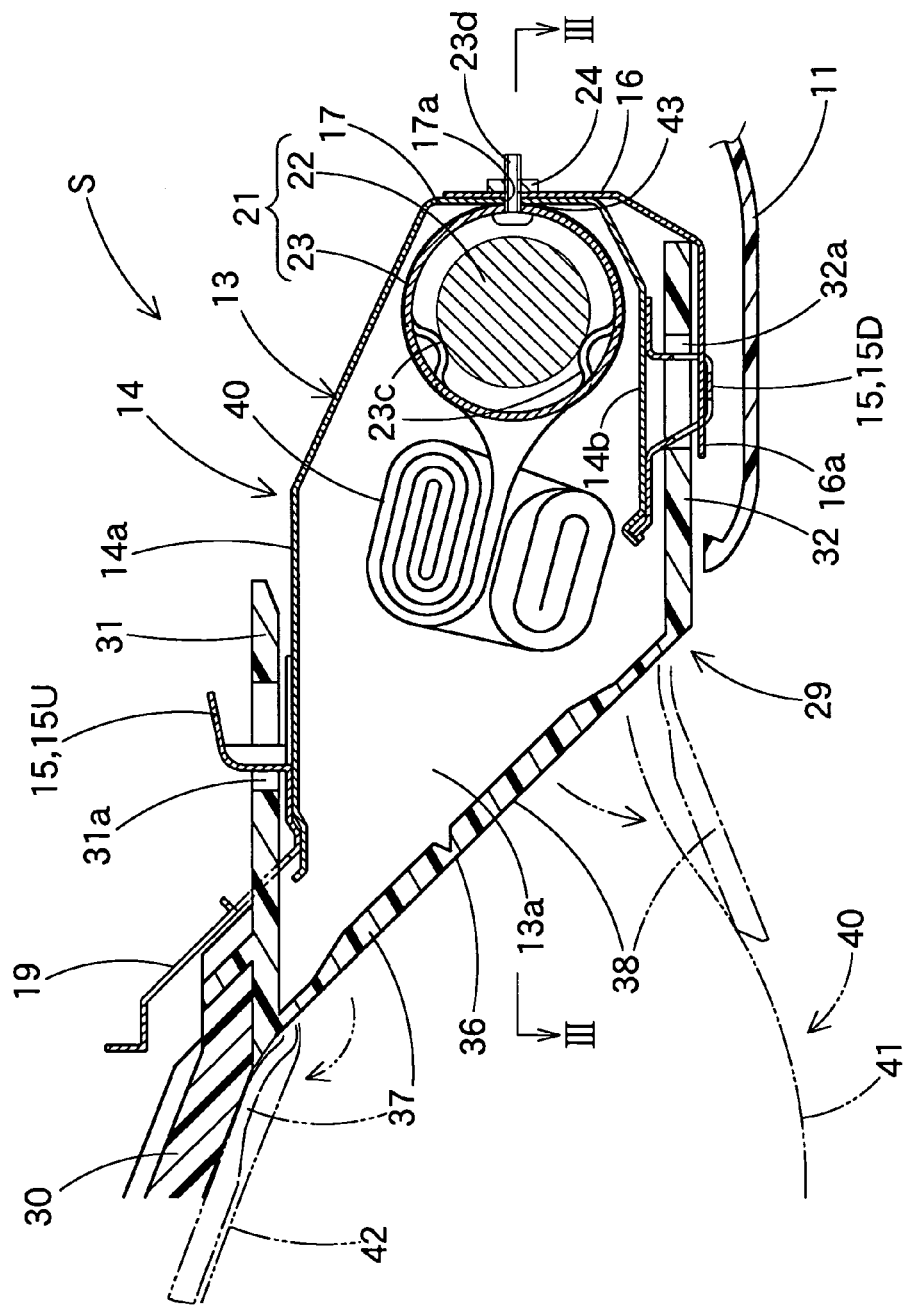
FIG. 2 is a schematic enlarged vertical section of the knee-protecting airbag device of FIG. 1, taken along the front-rear direction of the vehicle.
Figure 3:
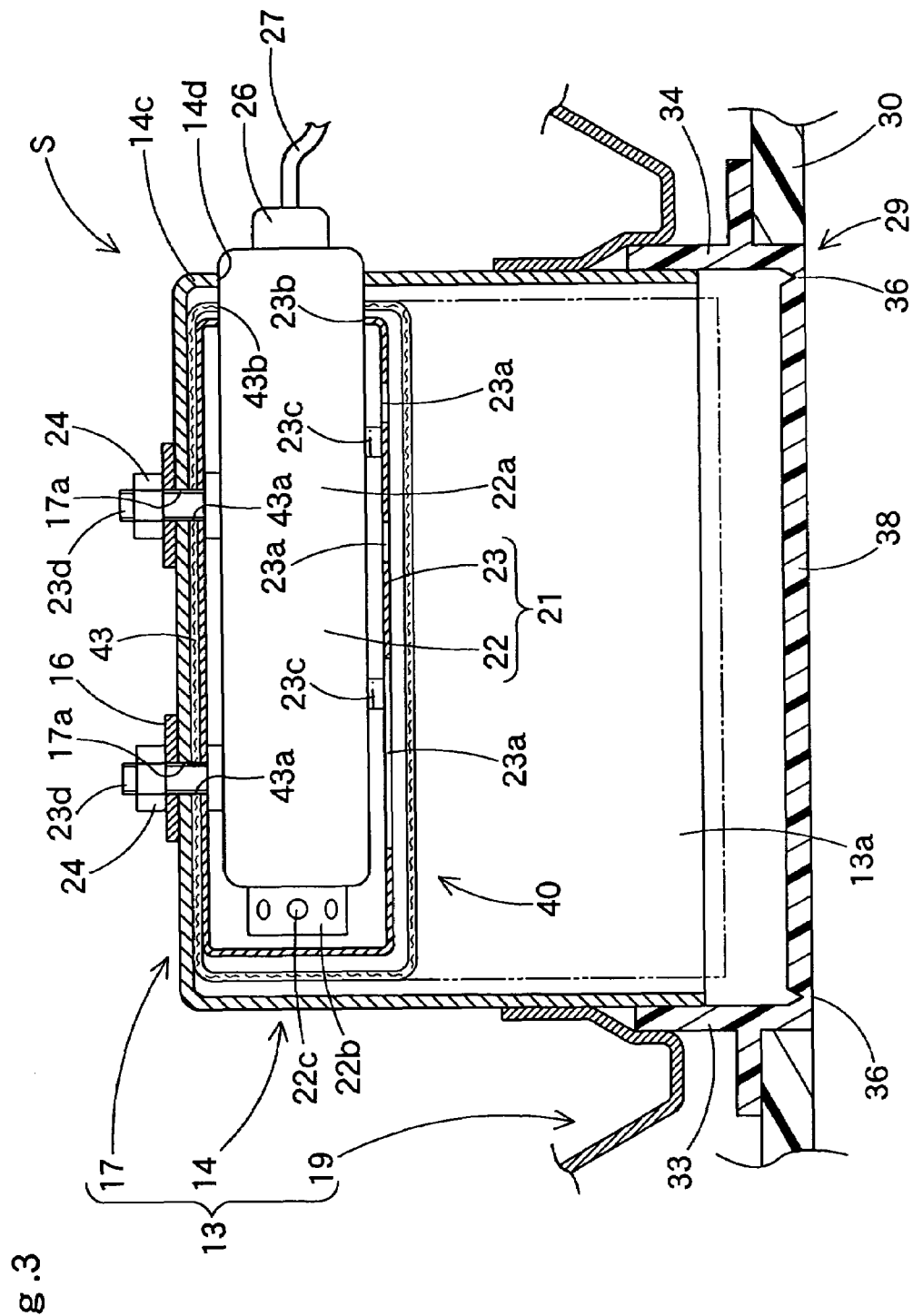
FIG. 3 is a schematic enlarged horizontal section of the knee-protecting airbag device of FIG. 1 taken along the front-rear direction of the vehicle, and corresponds to line III—III in FIG. 2.

The housing 13 is made of sheet metal. Referring to FIGS. 1 to 3, the housing 13 is located below the steering column 2, and includes a substantially square cylindrical circumferential wall portion 14, a bottom wall 17 for closing vehicle's front side of the circumferential wall portion 14, and a substantially rectangular opening 13a located at the vehicle's rear side. The circumferential wall portion 14 of the housing 13 is provided, on outer surfaces of its walls 14a and 14b confronting each other in the vertical direction, with a plurality of retainers 15 (15U and 15D) for attaching side walls 31 and 32 of the airbag cover 29 to the housing 13.

Each of the retainers 15U formed on the outer surface of the upper wall 14a is formed into a hook shape and adapted to be inserted in a retaining hole 31a in the upper side wall 31 of the airbag cover 29, and retain edges of the retaining holes 31a. The retainers 15U are located in plurality along the vehicle's transverse direction, correspondingly to the retaining holes 31a in the upper side wall 31. Each of the retainers 15D is formed into a projection shape and is adapted to be inserted in a retaining hole 32a in the lower side wall 32 of the airbag cover 29. The retainers 15D are also located in plurality along the vehicle's transverse direction correspondingly to the retaining holes 32a in the lower side wall 32. A locking member 16 is inserted into each of the retaining projections 15D for preventing the projections 15D from coming off from the retaining holes 32a after being put in the retaining holes 32a. The locking member 16 is attached to the housing 13 while having its insert portions 16a inserted respectively in between the outer surface of the lower side wall 32 and inner circumference of each of the retaining projections 15D.

Referring to FIG. 3, the circumferential wall portion 14 is further provided on its right side wall 14c with an insert hole 14d for inserting the end of inflator body 21 thereinto. The bottom wall 17 is provided with two insert holes 17a for inserting individual bolts 23d of the inflator 21 thereinto.

The housing 13 further includes a flange 19 extended outwardly from the circumferential wall portion 14 to encircle the opening 13a. The housing 13 is secured to vehicle body utilizing unillustrated brackets protruded from predetermined positions of the flange 19, the circumferential wall portion 14 and the bottom wall 17.

Referring to FIGS. 2 and 3, the inflator 21 is of a cylinder type which locates its axial direction along the vehicle's transverse direction, and includes a substantially cylindrical body 22 and a diffuser 23. The body 22 includes a substantially cylindrical general portion 22a and a small diameter portion 22b protruded from an end face of the general portion 22a. The small diameter portion 22b includes in its outer circumference with a plurality of gas discharge ports 22c. The other end face of the general portion 22a apart from the small diameter portion 22b is connected with a connector 26 for inputting actuating signals via a lead wire 27.

The diffuser 23 has a substantially cylindrical shape for covering the inflator body 22, and is closed at one end in its length direction and opened at the other end, which serves as an insert hole 23b. The diffuser 23 is provided in its rear side face as mounted on the vehicle with a plurality of gas outlet ports 23a for emitting inflation gas G. The diffuser 23 further includes a plurality (two, in the illustrated embodiment) of bolts 23d protruded forward of the vehicle, and a plurality of clamping portions 23c for holding the body 22. To attach the inflator body 22 to the diffuser 23, the body 22 is inserted into the diffuser 23 through the insert hole 23b, from the small diameter portion 22b. Then each of the clamping portions 23c is pressed onto the outer circumference of the general portion 22a. Thus the body 22 is fixed to the diffuser 23. If each of the bolts 23d is inserted into the through hole 17a of the bottom wall 17 of the housing 13, and then a nut 24 is fastened with the bolt 23d, the inflator 21 is secured to the housing 13.

The inflator 21 is actuated by an actuating signal inputted through the lead wire 27 when airbag actuating circuit mounted on the vehicle detects frontal collision of the vehicle. At this time, an unillustrated airbag device mounted on steering wheel 1 is actuated simultaneously.

The airbag cover 29 is configured to cover the vehicle's rearward of the opening 13a and the flange 19 of the housing 13, and is joined with and supported by the housing 13. As referred to FIGS. 1, 2 and 8A, the airbag cover 29 is located toward a lower panel 10b of the dashboard 10 which is composed of an upper panel 10a and a lower panel 10b, in the periphery of the column cover 5, for covering the lower periphery of the column cover 5 protruded from the dashboard 10.

The airbag cover 29 includes two doors 37 and 38 covering the opening 13a of the housing 13 at the vehicle's rear side, and a general portion 30 that is located around the doors 37 and 38 and to be enclosed by the lower panel 10b when it is mounted on the vehicle. The airbag cover 29 is a two-color part whose part including the doors 37 and 38 and the side walls 31, 32, 33 and 34 is made from thermoplastic elastomer of polyolefin or the like, while the general portion 30 located around those members is made from synthetic resin such as polypropylene.

The doors 37 and 38 are respectively formed in a substantially rectangular plate shape, and are provided therearound with a thin breakable portion 36 having an H shape. The breakable portion 36 is so provided with continuous or intermittent grooves in the vehicle's front side face of the airbag cover 29 as to be easily broken when the doors 37 and 38 are pushed by the inflating airbag 40. When the breakable portion 36 is pushed and broken by the airbag 40, the door 37 opens upward around its upper end near the upper side wall 31, and the door 38 opens downward around its lower end near the lower side wall 32.

From the periphery of the doors 37 and 38 are protruded forward four side walls 31, 32, 33 and 34 to neighbor the circumferential wall portion 14 of the housing 13 from outside. The airbag cover 29 is joined to and held by the housing 13 at the upper side wall 31 located above the case circumferential wall portion 14 and the lower side wall 32 located below the circumferential wall portion 14. As described above, the walls 31 and 32 are provided with retaining holes 31a and 32a, respectively, in which the individual retainers 15 (15U and 15D) located in the circumferential wall portion 14 are inserted and held.

The airbag 40 takes a substantially rectangular plate shape when expanded and inflated completely, as shown in FIGS. 1, 4 to 6, and 8. The airbag 40 is transversely wide enough to protect both knees K of the driver D. The airbag 40 is configured to locate its driver's side wall 41 toward the driver D, and locate its column side wall 42 toward the column cover 5 when completely deployed. The walls 41 and 42 have substantially the same shapes.

As constituent parts of the walls 41 and 42, the airbag 40 includes a single body cloth 51 having a shape in which the walls 41 and 42 are connected at lower end 40b of the airbag 40, and two pieces of reinforcing cloths 53 having substantially square shapes. The body cloth 51 and reinforcing cloths 53 are made of flexible fabric woven of polyester, polyamide yarns or the like.

It will also be appreciated to form the reinforcing cloths 53 of even more heavy-duty material than the body cloth 51. For example, the reinforcing cloths 53 may be made of a fabric employing strong yarns of aramid fiber or the like. Alternatively, it may be made of a fabric of more bulky yarn than the body cloth 51, or of a fabric with higher yarn density than the body cloth 51.

Figure 8B:
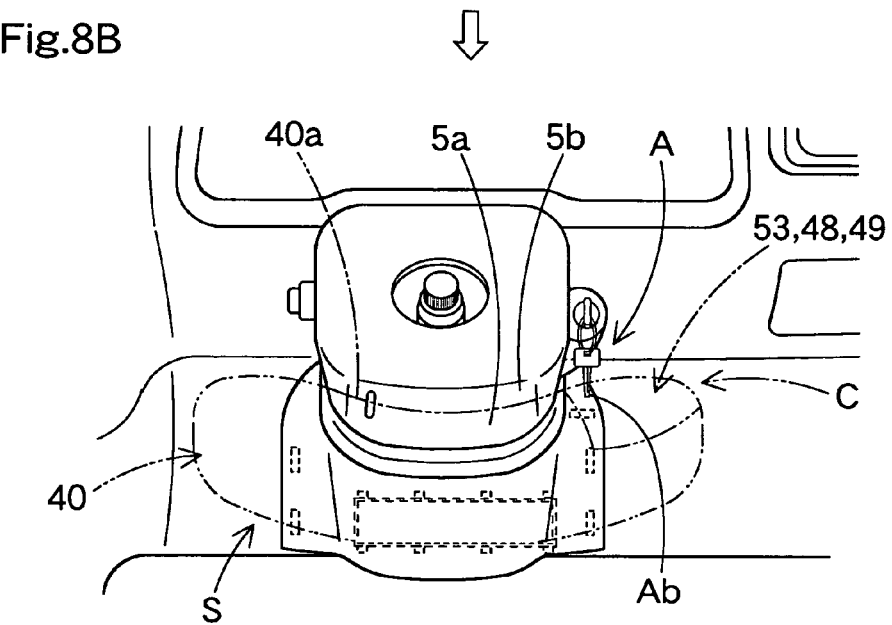

In this airbag 40, a portion around the right edge corner C in the upper edge 40a serves as a cover portion 48 for covering vehicle's rearward of the key cylinder 6 when the airbag 40 is mounted on the vehicle and completes deployment, as shown in FIGS. 1 and 8B. This cover portion 48, upon airbag deployment, also covers an area of the key accessories A which are connected to and hung down from the key E inserted in the key cylinder 6 from rearward. In the illustrated embodiment, the cover portion 48 itself equals to a contact portion 49 which contacts with key accessories A upon deployment of the airbag 40. The reinforcing cloths 53 are applied to the outer surfaces of the driver's side wall 41 and the column side wall 42 in the area of the contact portion 49.

Figure 4:
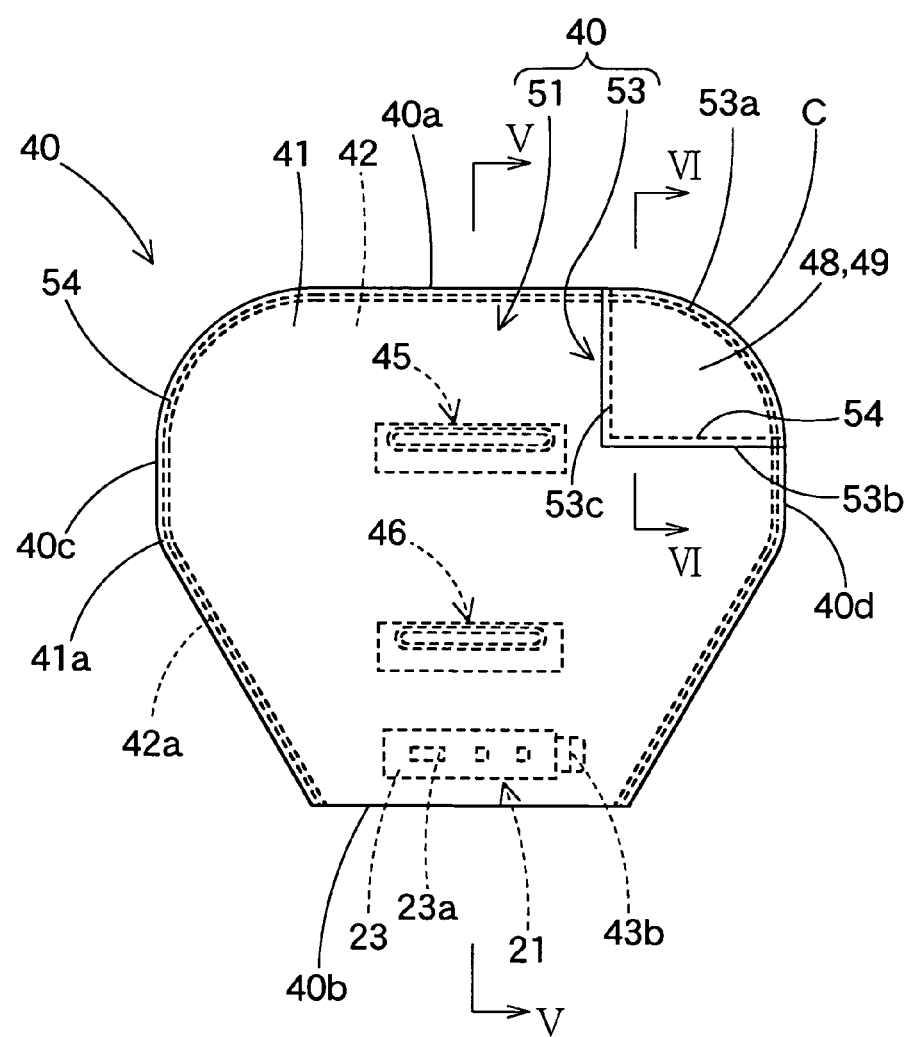
FIG. 4 is a schematic front view of an airbag used in the knee-protecting airbag device of FIG. 1, as expanded and has an inflator internally thereof.
Figure 5:
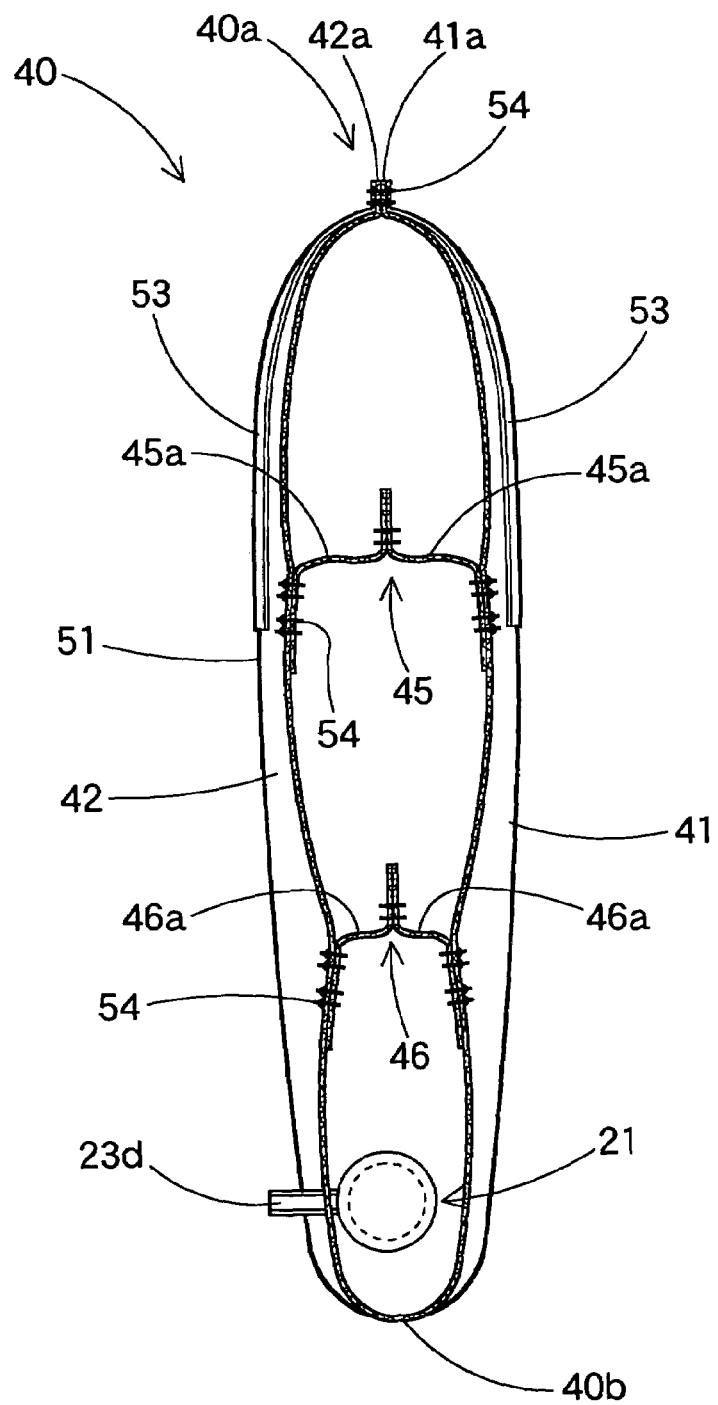
FIG. 5 is a schematic section taken along line V-V in FIG. 4.

Referring to FIG. 4, the airbag 40 is internally provided with two tethers 45 and 46 arranged along the transverse direction and in up and down rows. Each of the tethers 45 and 46 is adapted to join the walls 41 and 42 and keep the inflated airbag 40 in plate-like shape. Each of the tethers 45 and 46 is made of two pieces of cloth member 45a or 46a which are connected to either one of the walls 41 and 42 and joined to each other.

As shown in FIGS. 3 and 7, the airbag 40 is provided in a portion 43 in the column side wall 42 near the lower edge 40b with two insert holes 43a and an insert hole 43b. The insert holes 43a are for inserting the individual bolts 23d of the inflator 21 therethrough, and the insert hole 43b is for inserting the body 22 of the inflator 21 therethrough. The airbag 40 is attached to the housing 13 with the inflator body 22 protruded from the insert hole 43b, and with the peripheries of the individual insert holes 43a clamped by the diffuser 23 and the bottom wall 17 of the housing 13. In other words, the airbag 40 is secured to the bottom wall 17 of the housing 13 by the insert holes 43a peripheries serving as a mounting portion 43.

Figure 6:
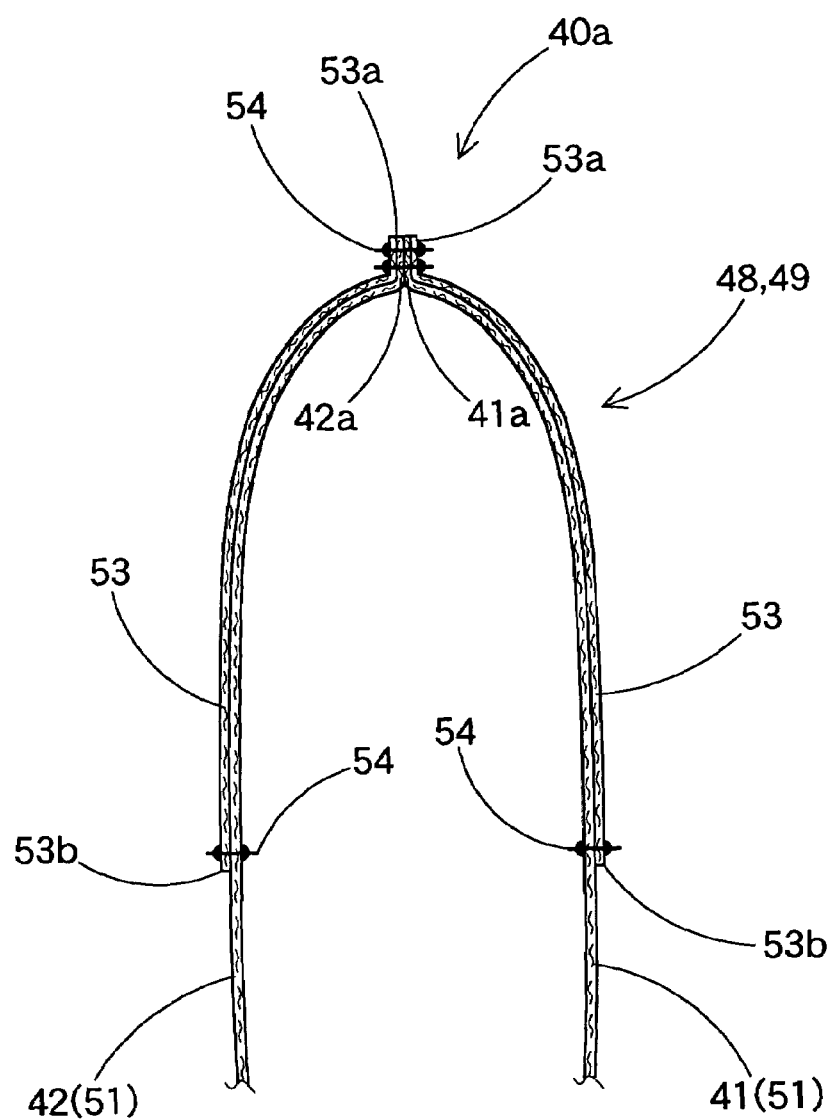
FIG. 6 is a schematic enlarged section taken along line VI—VI in FIG. 4.

To manufacture the airbag 40, the reinforcing cloths 53 are firstly located in predetermined positions on the outer surfaces of the driver's side wall 41 and the column side wall 42 of the body cloth 51, and are sewn thereto by sewing yarn 54. More specifically, the reinforcing cloths 53 are located in the contact portion 49, and are sewn to the walls 41 and 42 at their outer edges except a portion to be the outer edges 41a and 42a of the walls 41 and 42, respectively, as shown in FIGS. 4 and 6. These sewn portions will be called below singly-sewn portions 53b and 53c. The reinforcing cloths 53 are sewn only at the portions 53b and 53c because the remaining outer edges (as will be called "collectively-sewn portions") 53a of the reinforcing cloths 53 are sewn together with the outer edges 41a and 42a of the walls 41 and 42 in sewing up the outer edges 41a and 42a. The body cloth 51 is provided with the insert holes 43a and 43b in advance.

Thereafter, ends of the cloth members 45a and 46a for constituting the tethers 45 and 46 are sewn to predetermined positions in the inner surface of the airbag 40 in the walls 41 and 42 by sewing yarn 54. The body cloth 51 is folded in two at the lower edge 40b of the airbag 40, and the cloth members 45a and 46a are sewn up, respectively, to form the tethers 45 and 46. If then the overlaid outer edges of the body cloth 51 or the outer edges 41a and 42a of the walls 41 and 42 are sewn up together with the edges 53a of the reinforcing cloths 53 by sewing yarn 54, the airbag 40 is formed. The inflator 21 is located within the airbag 40 before the entire outer edges 41a and 42a are sewn up.

To assemble the airbag device S, the airbag 40 with the inflator 21 housed therein is so folded as to be housed within the housing 13. The inflator 21 is housed in the airbag 40 such that the bolts 23d are protruded from the individual insert holes 43a, and the end of the inflator body 22 is protruded from the insert hole 43b.

Folding process of the airbag 40 consists of a transverse folding process in which the upper edge 40a is brought close to the lower edge 40b on folds along the transverse direction, and a vertical folding process to adjust the transverse width of the airbag 40 to fit the width of the housing 13 on folds along vertical direction (or front-rear direction).

In the foregoing embodiment, the vertical folding process includes two steps. Firstly, as shown in FIGS. 7A and 7B, from a state in which the column side wall 42 and the driver's side wall 41 are flatly overlaid on each other, the left edge 40c and right edge 40d of the airbag 40 are folded toward the transverse center O1 on folds F1 located along the front-rear direction (or vertical direction) near the left and right edges 40c and 40d. At this time, the reinforcing cloths 53 are folded together. Since the reinforcing cloths 53 are flexible, the folding of the airbag 40 is made smoothly.

Thereafter, the transverse folding process is applied as shown in FIGS. 7B and 7C. More specifically, the upper edge 40a of the airbag 40 is roll-folded on the column side wall 42 toward the lower edge 40b.

As referred to FIGS. 7C and 7D, then, the left and right ends 55b of a roll-folded portion 55 is folded to be located below a center 55a of the folded portion 55, so that the airbag 40 is folded to have a transverse width to fit in the housing 13, and thus the folding process of the airbag 40 is completed.

Thereafter, an unillustrated breakable wrapping film is wrapped around the airbag 40 for keeping the folded-up shape. At this time, the bolts 23d of the inflator 21 and the end of the inflator body 22 which are protruded from the insert holes 43a and 43b are taken out from the wrapping film. Other than resin sheet member, cloth member such as a woven fabric that forms the airbag 40, tape member, or string member may be employed as the wrapping film.

Thereafter, the inflator 21 is housed in the housing 13 together with the folded airbag 40 so that the individual bolts 23d of the inflator 21 are protruded from the insert holes 17a while the end of the inflator body 22 is protruded from the insert hole 14d. Then if unillustrated spring nuts are fastened with the individual bolts 23d, the inflator 21 and the airbag 40 are housed in and attached to the housing 13.

Subsequently, the airbag cover 29 is attached to the housing 13. More specifically, the individual side walls 31, 32, 33 and 34 of the airbag cover 29 are located around the circumferential wall portion 14 of the housing 13 toward the opening 13a. At this time, the individual hooks 15U are so inserted into the retaining holes 31a in the upper side wall 31 as to be retained thereat, and the individual projections 15D are inserted into the corresponding retaining holes 32a in the lower side wall 32 so as to project on the outer surface of the lower side wall 32. Then the insert portions 16a of the locking member 16 are inserted between the outer surface of the lower side wall 32 and the inner circumference of the individual projections 15D, the individual bolts 23d are put through the locking member 16, and the nuts 24 are fastened with the bolts 23d. Thus the airbag cover 29 is joined to and held by the housing 13, and the airbag device S is formed.

Then the airbag device S is mounted on the vehicle by connecting the connector 26 having the lead wire 27 joined thereto to the body 22 of the inflator 21, securing the brackets extending from the housing 13 to vehicle body, and connecting the lead wire 27 to the airbag actuating circuit.

The upper panel 10a and the lower panel 10b have been attached to the vehicle by this time. An under cover 11 is attached after the airbag device S is mounted on the vehicle.

After the airbag device S is mounted on the vehicle, if a predetermined actuating signal is inputted to the inflator body 22 via the lead wire 27, inflation gas is discharged from the gas discharge ports 22c of the inflator 21. The gas then flows into the airbag 40 via the gas outlet ports 23a of the diffuser 23. The airbag 40 inflates and breaks the wrapping film, pushes the doors 37 and 38 of the airbag cover 29, and breaks the breakable portion 36 to open the doors 37 and 38. Then as indicated by double-dotted lines in FIG. 1, the airbag 40 protrudes rearward from the opening 13a of the housing 13, and further expands and inflates upward along the column cover lower surface 5a of the steering column 2.

In the knee-protecting airbag device S, when the airbag 40 protrudes from the housing 13 by admitting inflation gas, the airbag 40 expands and inflates while unfolding in a substantially inverse process to the folding process. Accordingly, the deploying airbag 40 unrolls while having its upper edge 40a to rise along the lower (rear) surface 5a of the column cover 5 up to the vicinity of upper end 5b of the column cover 5.

At this time, even if the airbag 40 contacts the accessories A hung down from the key E inserted into the key cylinder 6, as shown in FIGS. 1, 7A and 7B, the airbag 40 is able to complete deployment smoothly since the airbag 40 is provided in the contact portion 49 with the reinforcing cloths 53 and the reinforcing cloths 53 protects the body cloth 51 of the airbag 40 upon contacting the accessories A.

In the knee-protecting airbag device S, therefore, the airbag 40 is able to protect the knees K of driver D securely since the airbag 40 is protected by the reinforcing cloths 53, even if the deploying airbag 40 contacts the accessories A connected to the key E.

In the airbag 40, the reinforcing cloths 53 are attached both to the column side wall 42 and the driver's side wall 41 in the portion 49 contactable with the accessories A. Accordingly, the airbag 40 is protected whichever of the column side wall 42 and the driver's side wall 41 contacts the key accessories A in the deployment of the airbag 40.

More specifically, the airbag 40 is roll-folded on the column side wall 42 in the transverse folding step to bring the upper edge 40a closer to the lower edge 40b. When the airbag 40 is unfolded, accordingly, the upper edge 40a including the contact portion 49 normally unfolds and rises along the lower surface 5a of the column cover 5, as indicated by double-dotted lines in FIG. 1. Thus, the contact portion 49 to contact the accessories A is normally the upper edge 40a in the driver's side wall 41.

Figure 9:
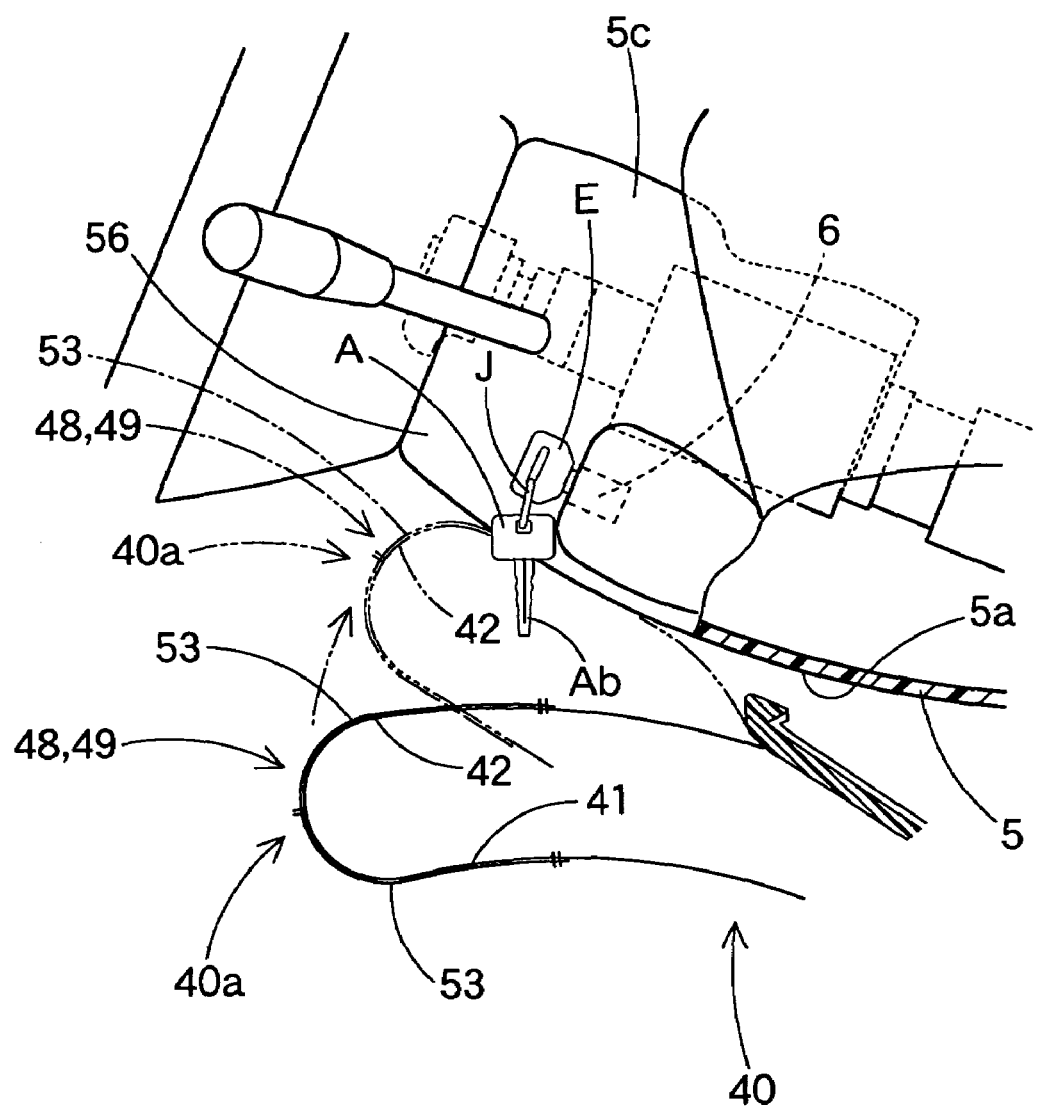
FIG. 9 is a side view illustrating an occasional behavior of the knee-protecting airbag device in FIG. 1.

However, it is liable that the airbag 40 approaches the lower surface 5a of the column cover 5 and contacts the key accessories A after completing deployment, as shown in FIG. 9, because of, for example, the door 37 of the airbag cover 29 touching the airbag 40 itself. In this case, the contact portion 49 to contact the accessories A is the upper edge 40a in the column side wall 41.

Since the reinforcing cloths 53 are attached both to the column side wall 42 and the driver's side wall 41, however, the airbag 40 is protected whichever of the column side wall 42 and the driver's side wall 41 contacts the key accessories A upon deployment of the airbag 40.

If the expanding condition of the airbag 40 is stable and either one of the walls 41 and 42 constantly be the contact portion 49 to contact the key accessories A, the reinforcing cloth 53 may be attached only to the wall to be the contact portion 49.

However, the arrangement of locating the reinforcing cloths 53 both on the walls 41 and 42 has an advantage over the above arrangement in being applicable even when the folding method of the airbag 40 is changed and the contact portion 49 to contact the accessories A is reversed in the column side wall 41 and the driver's side wall 42, for example.

Figure 10:
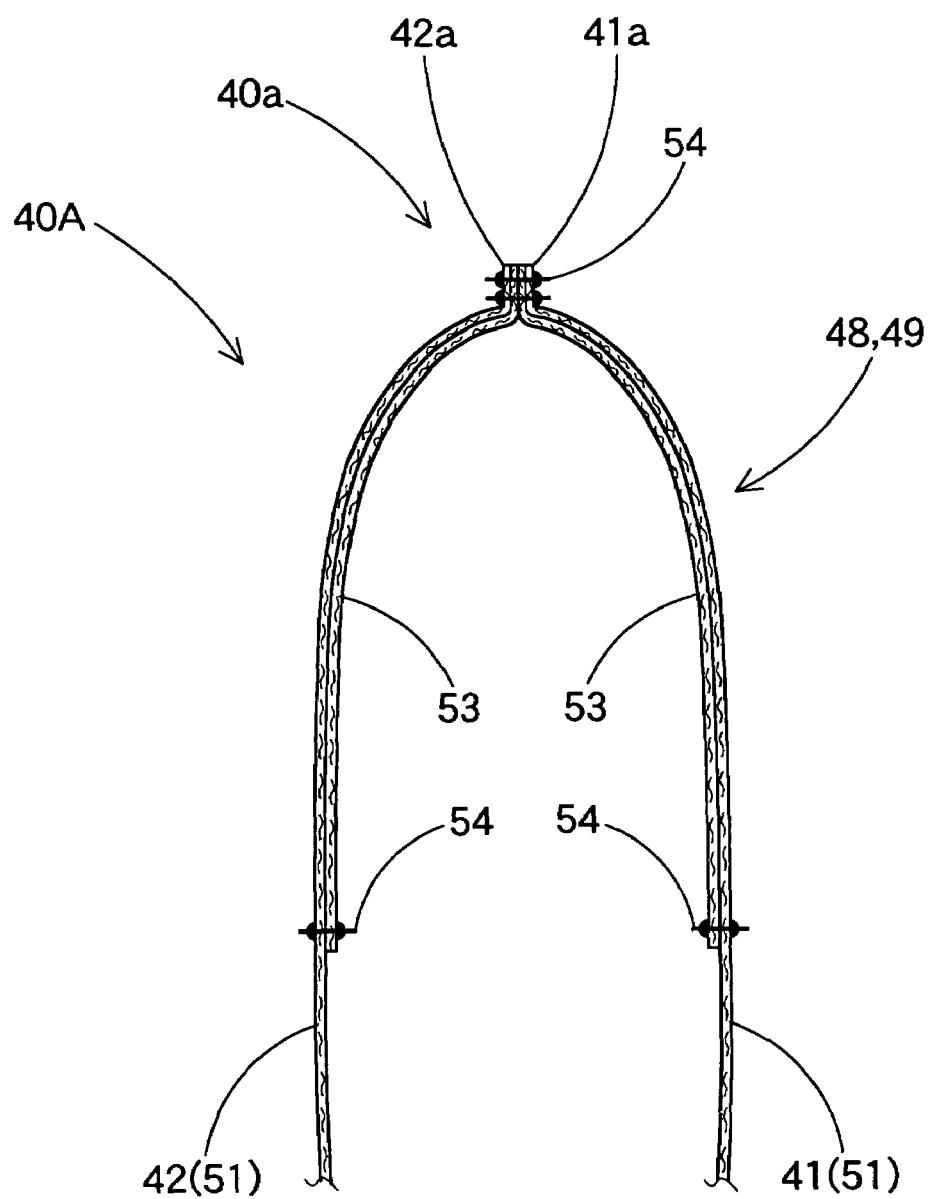
FIG. 10 is a partial enlarged section of a modification of the airbag.

A plurality of the reinforcing cloths 53 may be used in layers. Moreover, although the foregoing embodiment shows the reinforcing cloths 53 exposed on the outer surface of the airbag 40, the airbag may be constructed as an airbag 40A shown in FIG. 10, of which the reinforcing cloths 53 are located in the inner surface. In this case, however, the airbag 40A must be constructed to keep the bag shape as a whole even when the body cloth 51 exposed on outer surface is damaged, by joining the outer edges of the reinforcing cloths 53 to the body cloth 51 and preventing the reinforcing cloths 53 from being damaged.

Figure 11A:
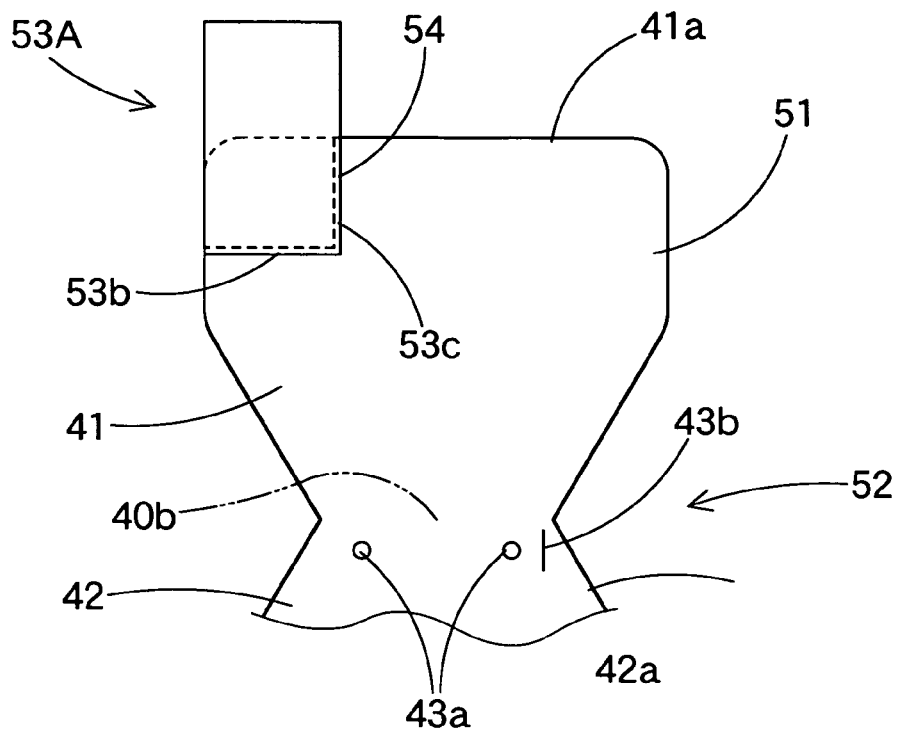
FIGS. 11A and 11B illustrate manufacturing processes of another modification of the airbag.
Figure 11B:
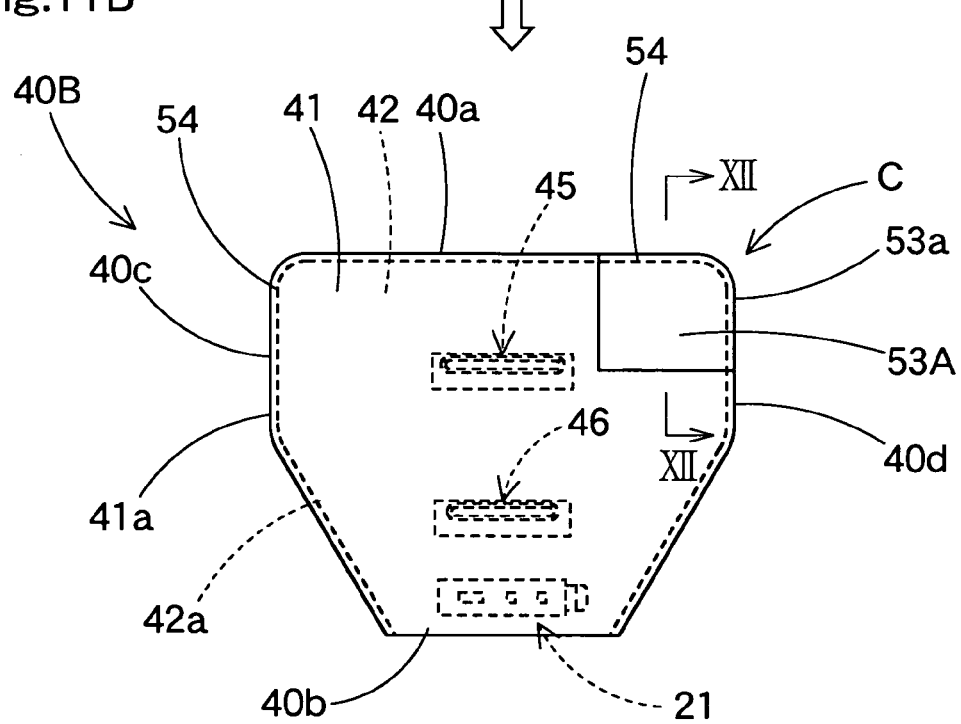
Figure 12:
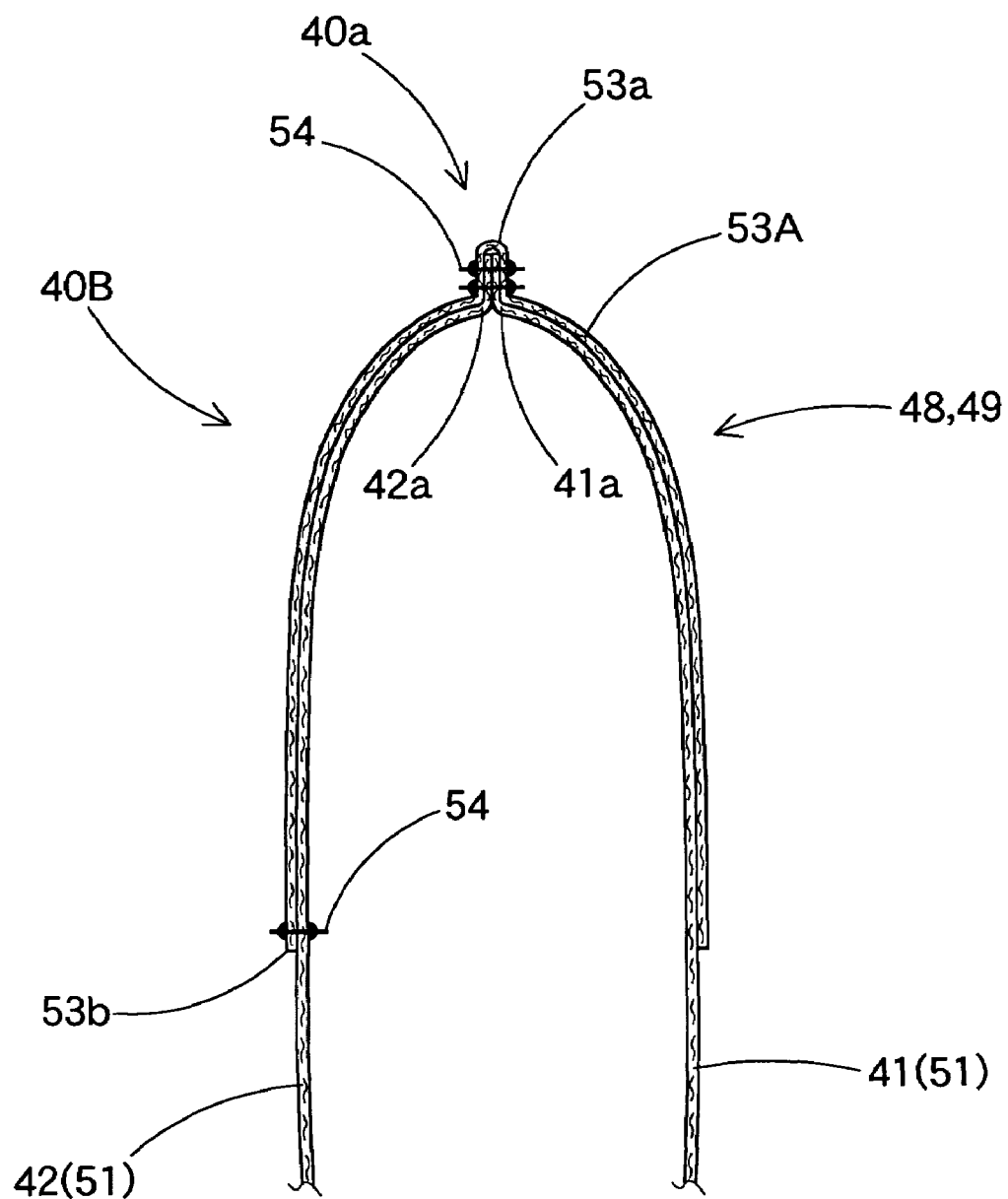
FIG. 12 is a schematic enlarged section taken along line XII—XII in FIG. 11.

When both of the driver's side wall 41 and the column side wall 42 are provided with the reinforcing cloth, only one piece of the reinforcing cloth 53A may be employed as in an airbag 40B shown in FIGS. 11 and 12. To manufacture the airbag 40B, the reinforcing cloth 53A is sewn to either one of the walls 41 and 42 at singly-sewn portions 53b and 53c before the body cloth 51 is folded at the lower end 40b of the airbag 40B. Then the body cloth 51 is folded in two, and the reinforcing cloth 53A is folded on the other wall 41 or 42 and the outer edges 41a and 42a are stitched up together with the collectively-sewn portions of the outer edges of the reinforcing cloth 53A. Thus the airbag 40B is formed with the single continuous reinforcing cloth 53A located on the outer surface of the walls 41 and 42.

Figure 13:
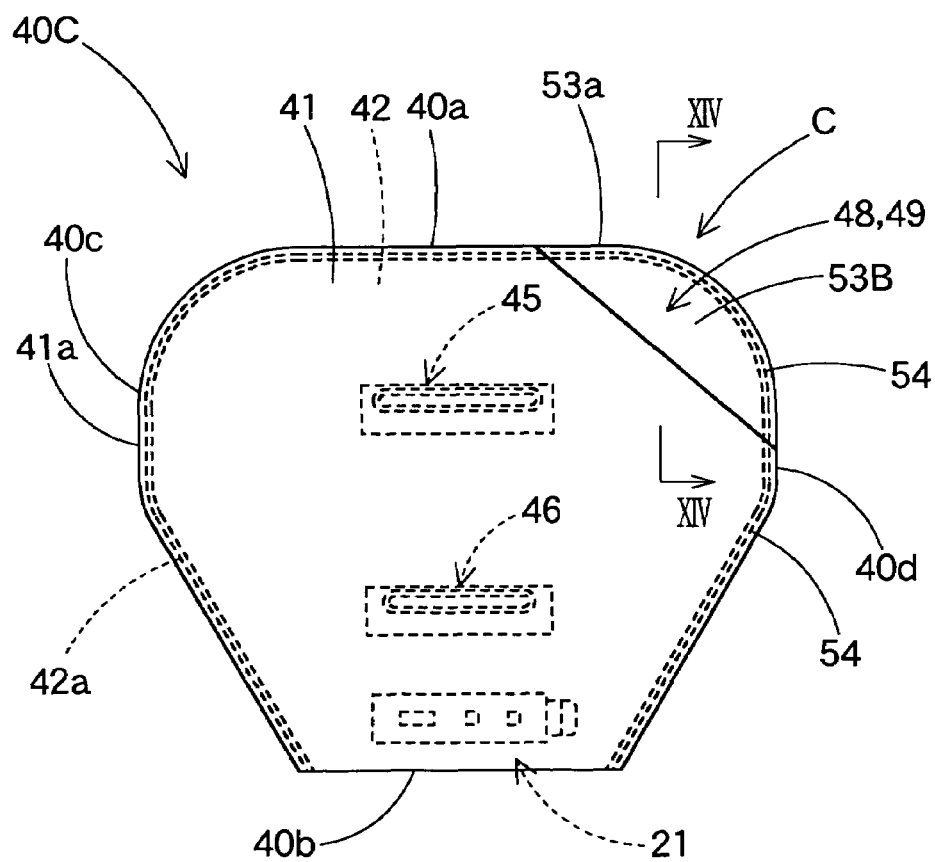
FIG. 13 is a front view of still another modification of the airbag.
Figure 14:
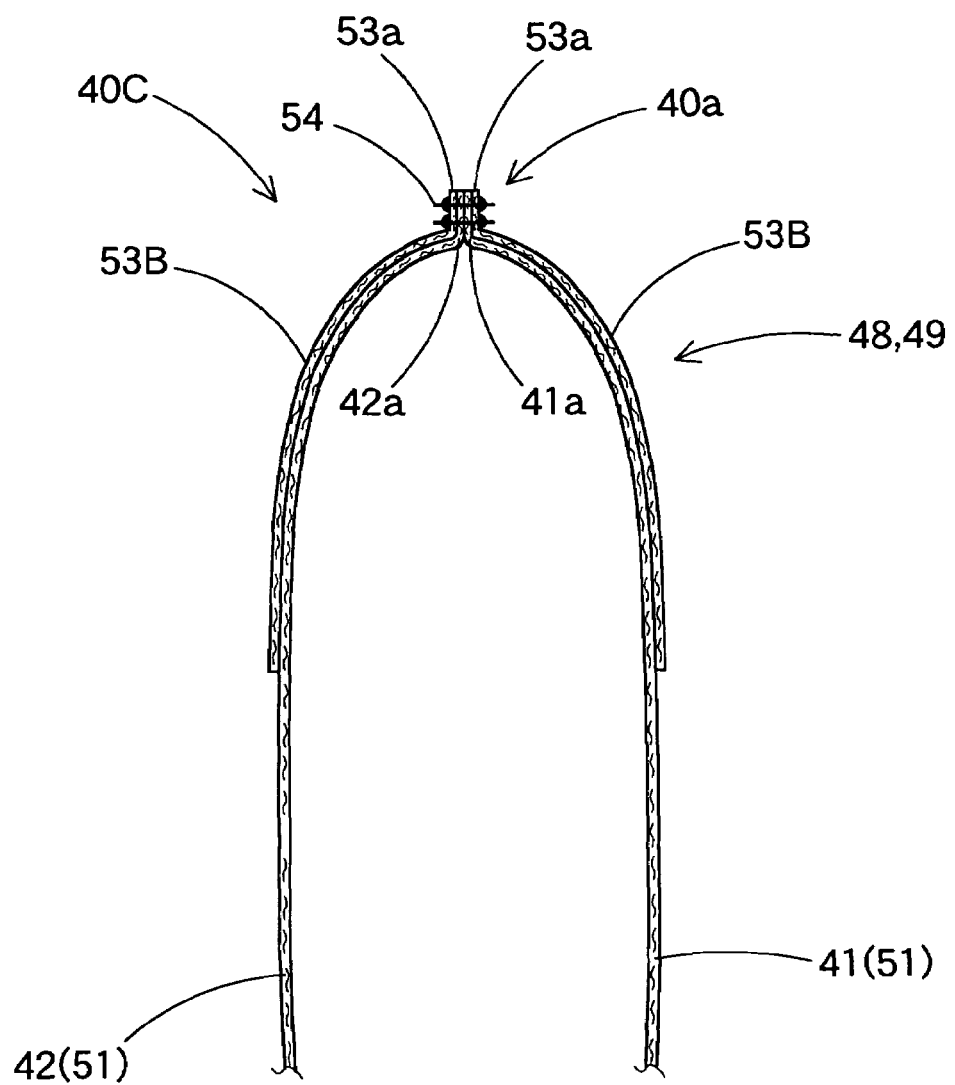
FIG. 14 is a schematic enlarged section taken along line XIV—XIV in FIG. 13.

In the case that the airbag is manufactured by sewing up the outer edges 42a and 41a of the column side wall 42 and the driver's side wall 41, as the airbag 40, an arrangement of an airbag 40C illustrated in FIGS. 13 and 14 will also be appreciated. In the airbag 40C, the collectively-sewn portion 53a of the reinforcing cloths 53B corresponding to the outer edges 41a and 42a of the column side wall 42 and the driver's side wall 41 is stitched together with the outer edges 42a and 41a in the stitching work of the outer edges 41a and 42a of the walls 41 and 42, and the reinforcing cloths 53B are applied to the airbag 40C only by the stitching to the outer edges 41a and 42a of the column side wall 42 and the driver's side wall 41. Since the collectively-sewn portion 53a is curved along the corner C from the upper edge 40a to the right edge 40d of the airbag 40C, the reinforcing cloths 53B are stably located in the airbag 40C only by being stitched to the outer edges 41a and 42a.

This arrangement is able to omit a separate stitching work of the reinforcing cloths 53B to the column side wall 42 and the driver's side wall 41. Therefore, the airbag 40C provided with the reinforcing cloths 53B is easily manufactured.

Figure 15:
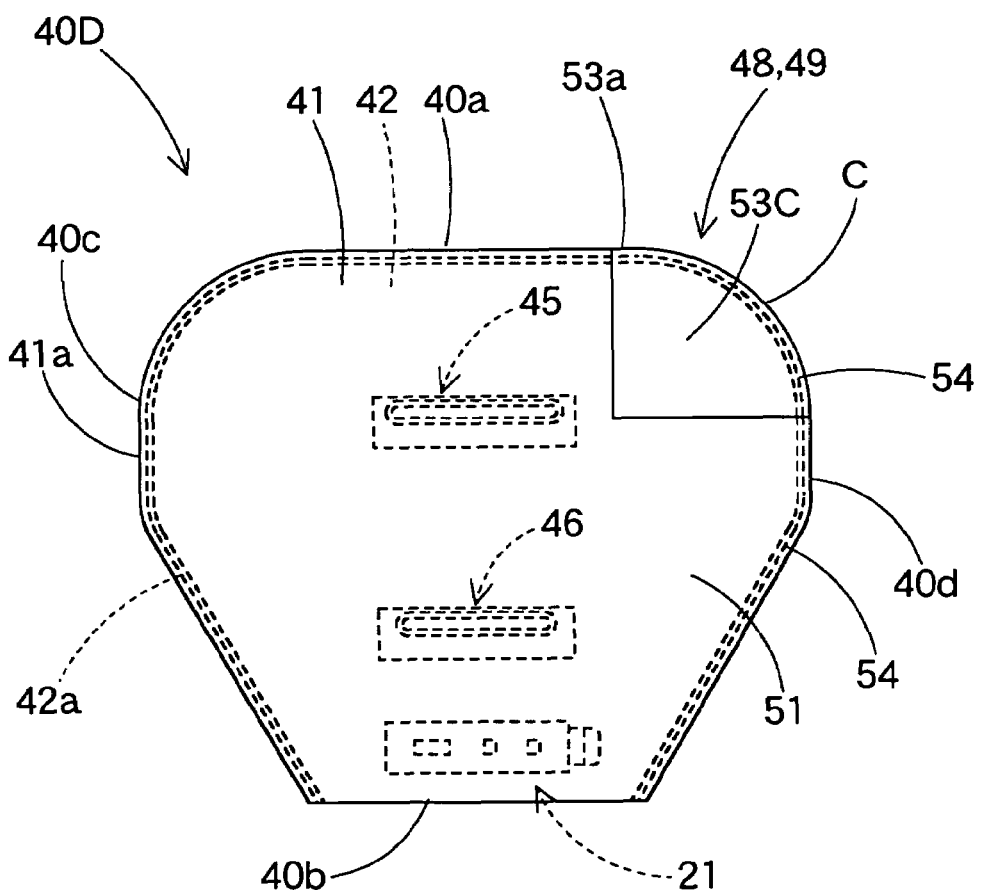
FIG. 15 is a front view of yet another modification of the airbag.

The shape of the reinforcing cloth stitched only to the outer edges 41a and 42a of the walls 41 and 42 is not intended to be limited to triangular shape like the cloth 53B illustrated in FIGS. 13 and 14, but may be substantially square shape like a reinforcing cloth 53C of an airbag 40D illustrated in FIG. 15.

It will also be appreciated to form the reinforcing cloth stitched only to the outer edges 41a and 42a of the walls 41 and 42 of a single continuous cloth member. In the airbag 40B illustrated in FIGS. 11A and 11B, for example, the reinforcing cloth 53A is located on the outer surface of the walls 41 and 42, and stitched only at positions corresponding to the outer edges 41a and 42a.

Of course, reinforcing cloths maybe attached to the airbag by adhesion or welding, not by stitching.

Figure 16:
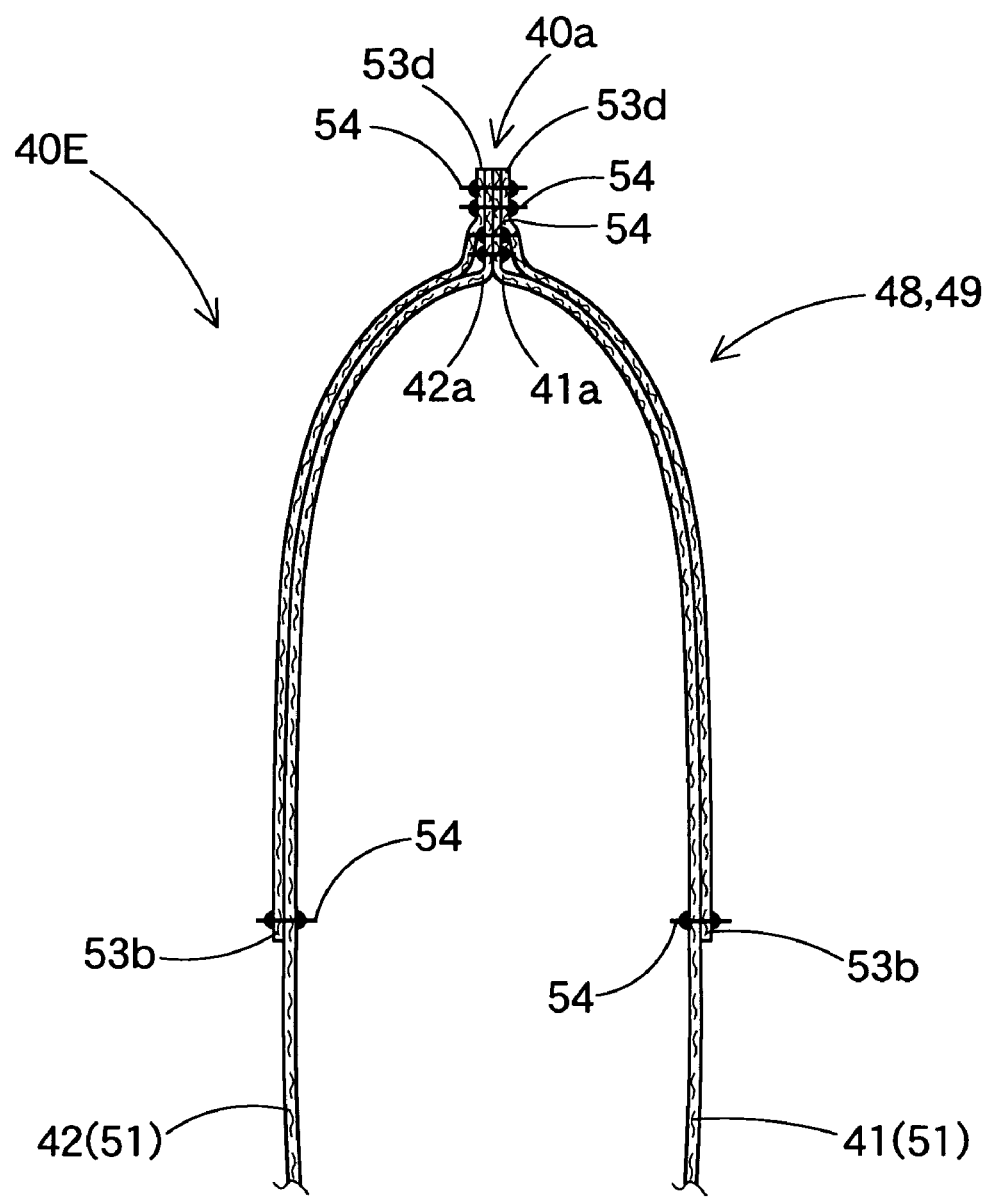
FIG. 16 is a partial enlarged section of yet another modification of the airbag.

The reinforcing cloths 53 do not necessarily have to be stitched together with the walls 41 and 42 in the sewing work of stitching up the outer edges 41a and 42a of the walls 41 and 42. As an airbag 40E illustrated in FIG. 16, for example, it will also be appreciated that the outer edges 41a and 42a of the walls 41 and 42 are stitched up firstly, and then the outer edges 53d of reinforcing cloths 53 are stitched to the walls 41 and 42 separately at the outer edges 53d.

Figure 17:
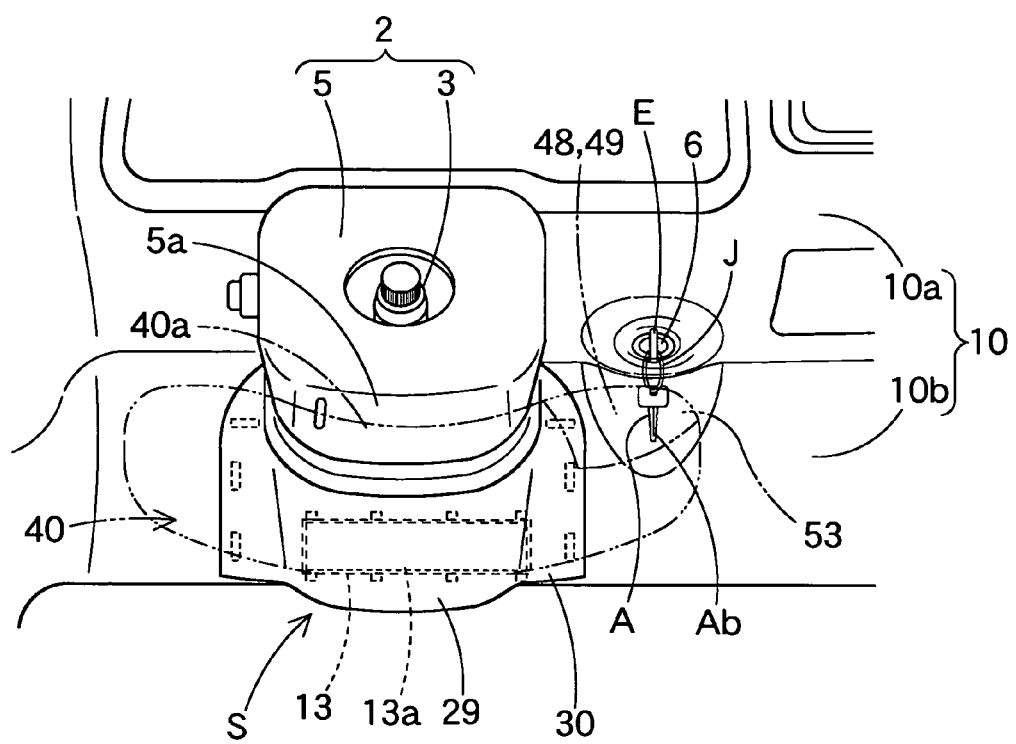
FIG. 17 is a front view of another embodiment of the knee-protecting airbag device of the present invention.

Although the foregoing embodiments are described on the ground that the key cylinder 6 is located in the steering column 2 (column cover 5) itself, the present invention can also be applied to a case in which the key cylinder 6 is located on the dashboard 10 (or on the upper panel 10a, as in FIG. 17), if the airbag 40 for a knee-protecting airbag device includes a contact portion 49 to contact with key accessories A of the key E inserted in the key cylinder 6.

Even if the key cylinder 6 is located on the left side face of the column cover 5 or in the dashboard 10 leftward of the column cover 5, the present invention can also be applied, of course, by locating a cover portion in the airbag for contacting the key accessories A of the key E inserted into the key cylinder 6.

What is claimed is:

1. A knee-protecting airbag device located below a steering column in front of a driver and, at a lower side of a key cylinder into which an ignition key with accessories is inserted, the airbag device comprising:
   a housing located below the steering column for housing an airbag;
   an airbag folded and housed in the housing in undeployed condition, and upon inflow of inflation gas, the airbag protruding rearward from the housing to deploy upward for protecting knees of the driver; the airbag including:
      a cover portion located in an upper edge of the airbag as completely deployed, for covering vehicle's rearward of an area proximate to the key cylinder; and
      a flexible reinforcing cloth located in a part of the cover portion to contact the key accessories when the key is inserted into the key cylinder, wherein:
   the airbag as completely deployed forms a substantially plate shape including a column side wall located toward the steering column and a driver's side wall located toward the driver's seat; and
   the reinforcing cloth is applied to an airbag part to contact the key accessories, both in the column side wall and the driver's side wall.

2. The knee-protecting airbag device according to claim 1, wherein the reinforcing cloth is constituted by a single piece of cloth, and located continuously in the column side wall and the driver's side wall.

3. A knee-protecting airbag device located below a steering column in front of a driver's seat and, at a lower side of a key cylinder into which an ignition key with accessories is inserted, the airbag device comprising:
   a housing located below the steering column for housing an airbag;
   an airbag folded and housed in the housing in undeployed condition, and upon inflow of inflation gas, the airbag protruding rearward from the housing to deploy upward for protecting knees of the driver; the airbag including:
      a cover portion located in an upper edge of the airbag as completely deployed, for covering vehicle's rearward of an area proximate to the key cylinder; and
      a flexible reinforcing cloth located in a part of the cover portion to contact the key accessories when the key is inserted into the key cylinder, wherein:
   the airbag as completely deployed forms a substantially plate shape including a column side wail located toward the steering column and a driver's side wall located toward the driver's seat;
   the airbag is manufactured by being stitched up at outer edges of the column side wall and the driver's side wall; and the reinforcing cloth is stitched up together when the outer edges of the column side wall and the driver's side wall are stitched up, and the reinforcing cloth is applied to the airing only by the stitching to the outer edges of the column side wall and the driver's side wall.

4. The knee-protecting airbag device according to claim 3, wherein:
  the reinforcing cloth is constituted by a single piece of cloth; and
  the reinforcing cloth is located continuously in the column side wall and the driver's side wall in an airbag part to contact the key accessories.

5. A knee-protecting airbag device located below a steering column in front of a driver's seat and, at a lower side of a key cylinder into which an ignition key with accessories is inserted, the airbag device comprising:
  a housing located below the steering column for housing an airbag;
  an airbag folded and housed in the housing in undeployed condition, and upon inflow of inflation gas, the airbag protruding rearward from the housing to deploy upward for protecting knees of the driver; the airbag including:
    a cover portion located in an upper edge of the airbag as completely deployed, for covering vehicle's rearward of an area proximate to the key cylinder; and
    a flexible reinforcing cloth located in a pan of the cover portion to contact the key accessories when the key is inserted into the key cylinder, wherein:
  the airbag includes an airbag body and the reinforcing cloth; and
  the reinforcing cloth is located on the outer surface of the airbag body.

6. A knee-protecting airbag device located below a steering column in front of a driver's seat and, at a lower side of a key cylinder into which an ignition key with accessories is inserted, the airbag device comprising:
  a housing located below the steering column for housing an airbag;
  an airbag folded and housed in the housing in undeployed condition, and upon inflow of inflation gas, the airbag protruding rearward from the housing to deploy upward for protecting knees of the driver; the airbag including:
    a cover portion located in an upper edge of the airbag as completely deployed, for covering vehicle's rearward of an area proximate to the key cylinder; and
    a flexible reinforcing cloth located in a part of the cover portion to contact the key accessories when the key is inserted into the key cylinder, wherein:
  the airbag includes an airbag body and the reinforcing cloth; and
  the reinforcing cloth is located on the inner surface of the airbag body.

* * * * *